Nov. 28, 1933. W. F. SCHACHT 1,937,440
TANK BALL
Filed March 28, 1932
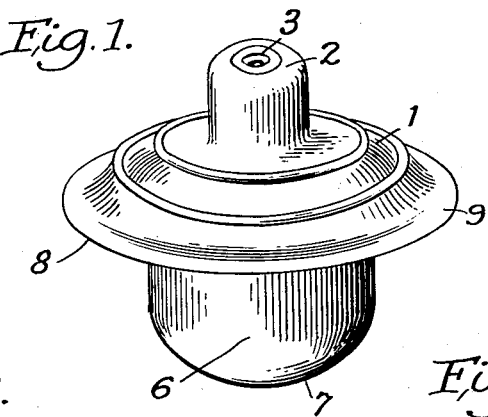
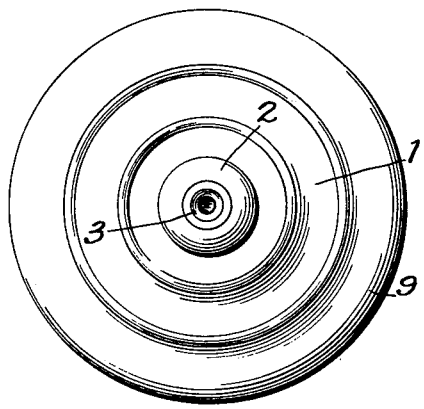
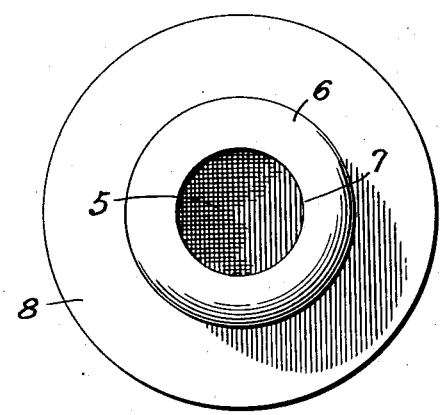
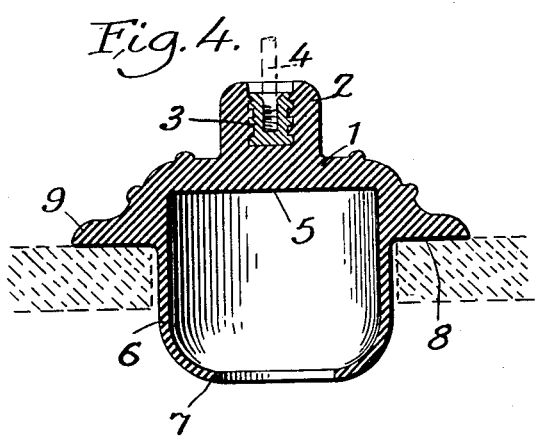
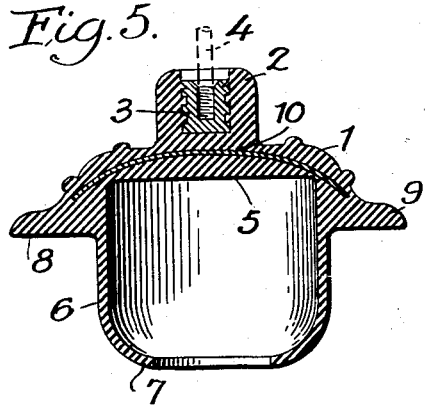
Inventor
William F. Schacht
Alexander Dowell
By
Attorney Patented Nov. 28, 1933

1,937,440

UNITED STATES PATENT OFFICE 1,937,440

TANK BALL

William F. Schacht, Huntington, Ind.

Application March 28, 1932. Serial No. 601,641

1 Claim. (Cl. 4—57)

This invention is a novel improvement in tank balls, and the principal object of the invention is to provide a flexible tank ball molded of pure gum or rubber consisting of a hollow body having a circumferential flange around its upper portion adapted to seat across the tank discharge opening and cut-off the flow of water, said flange being adapted to fit various sizes of openings, and embodying certain novel features of construction hereinafter set forth.

A further object of the invention is to provide a tank ball of the above type having a metal, canvas, or wire-screen or other reinforcement embedded in its upper portion to strengthen same.

Heretofore tank balls have necessarily been made in about four different sizes, as the hollow part of the ball is utilized for shutting the water off, but with my novel flanged ball only one size is required, as I do not depend on the hollow part, but upon the flat flange for cutting off the water supply.

Heretofore tank balls have been made of rubber, and after being used a short while they swell and become useless. Also tank balls have been made with a hard top, such as hard rubber to keep the tank ball from swelling. I preferably use a reinforcing metal plate which is molded in the rubber when making the ball, giving the ball a firm top and a flexible flange to shut off the water, and providing a ball which will not swell and get out of shape on account of the metal plate being molded in same.

I will explain the invention with reference to the accompanying drawing which illustrates several practical embodiments thereof to enable others familiar with the art to adopt and use the same, and will summarize in the claim the novel features of construction and novel combinations of parts for which protection is desired.

In said drawing:

Fig. 1 is a perspective view of the tank ball.

Fig. 2 is a top plan view thereof.

Fig. 3 is a bottom plan view.

Fig. 4 is a vertical section through one form of tank ball.

Fig. 5 is a vertical section through a modified form of tank ball.

As shown in the drawing, my novel tank ball preferably comprises a convex or arched body 1, of circular plan, having a centrally disposed knob 2 on its upper side in which is embedded a nut 3 whereby the ball may be readily attached to the operating rod 4. Preferably the lower face of the body 1 is flat and is provided with a centrally disposed recess portion 5 of circular shape and a downwardly extending annular flange 6 is molded integrally with the body 1 extending around the margin of the recess 5, said flange 6 being curved inwardly as at 7 at its lower end, whereby the lower open end of the ball is contracted. The margin of the body 1 extends beyond the flange 6 to form an annular portion 8 adapted to seat across the discharge opening of the tank and cut off the flow of water when the tank ball is seated, and the body 1 above the flange 8 is preferably relatively thick, and is rounded at its edge on its upper side as at 9.

Within the body 1 above the recess 5 a reinforcement 10 may be provided which in Fig. 5 consists of a circular metallic plate preferably slightly convex as shown and extending under the knob 2 of the body to the marginal flange 8, whereby the body 1 will be materially strengthened while maintaining the flexibility of the flange 8. Instead of using the metal plate a canvas, wire mesh, fabric or other substance may be used as a reinforcing means.

The flange 6 is open at its lower end and the entire tank ball is molded in one operation and being molded of pure gum will permit the flange 8 to readily conform with the outlet seat and effectively cut off the flow of water when the tank valve is seated, and since the flange 8 is flexible but is of substantial thickness the flange when seated will not readily warp or get out of shape and will be sufficiently durable for long use.

In my tank ball the circular flange 6 is not depended upon to stop the flow of water, the flange 8 performing this function and being adapted to fit various sizes of openings. Also the rounded edge 9 of the flange 8 enhances the appearance of the ball and also keeps the ball from sticking as it works up and down. The inturned flange 7 strengthens the ball and prevents tearing of the rubber when taken from the mold.

I claim:—

A molded rubber tank ball comprising a convex circular base having a centrally disposed circular recess in its lower face, a downwardly extending annular flange around the periphery of the recess of less diameter than the opening in the tank, said flange being contracted at its lower end to form a restricted opening thereinto; and a centrally disposed lifting knob on the upper face of the base, the marginal portion of the base extending beyond the circular flange forming the relatively thick flat valve of substantial width having its outer edge rounded sharply on its upper side and adapted to seat across the outlet of the tank.

WILLIAM F. SCHACHT.